(12) United States Patent
Lambert

(10) Patent No.: US 7,934,337 B1
(45) Date of Patent: May 3, 2011

(54) NET DEVICE

(76) Inventor: Lonnie Lambert, Ninilchik, AK (US)

( * ) Notice: Subject to any disclaimer, the term of this patent is extended or adjusted under 35 U.S.C. 154(b) by 759 days.

(21) Appl. No.: 11/891,486

(22) Filed: Aug. 9, 2007

(51) Int. Cl.
*A01K 77/00* (2006.01)

(52) U.S. Cl. .................................. 43/12; 43/11

(58) Field of Classification Search ............... 43/11, 12; 15/1.7
See application file for complete search history.

(56) References Cited

U.S. PATENT DOCUMENTS

| | | | | |
|---|---|---|---|---|
| 2,783,573 | A * | 3/1957 | Rau | 43/11 |
| 2,817,175 | A * | 12/1957 | Morris | 43/11 |
| 2,867,331 | A * | 1/1959 | Bader | 210/471 |
| 4,169,331 | A * | 10/1979 | Baker | 43/11 |
| 4,344,349 | A * | 8/1982 | Cordes | 84/411 R |
| 4,446,646 | A * | 5/1984 | van't Veld | 43/12 |
| 4,903,964 | A * | 2/1990 | Anderson | 473/489 |
| 5,203,055 | A * | 4/1993 | Broadwater, Sr. | 24/462 |
| 5,342,513 | A * | 8/1994 | Wall et al. | 210/238 |
| 5,360,208 | A * | 11/1994 | Fang | 473/489 |
| 5,858,221 | A * | 1/1999 | Conrad | 210/471 |
| 6,302,277 | B1 * | 10/2001 | Resh | 210/471 |

* cited by examiner

*Primary Examiner* — Kimberly S Smith (57) ABSTRACT

A major hoop member provides for protection of a minor hoop member and contact points between the minor hoop member and net material attached to the minor hoop member. The minor hoop member is of a significantly smaller diameter than a diameter of the major hoop member and is securely retained in close, but spaced, orientation radially inward from the major hoop member. This provides for the operational passageway through the minor hoop member which objects may be netted to be nearly as large as that available utilizing just the major hoop member. This full function feature occurs while the major hoop member protects the inner hoop member, and the contact points therealong of the net material, from coming into contact with many obstructions during use of the net device to net objects. Easy removal and replacement of the minor hoop member permits replacement of existing net material.

10 Claims, 9 Drawing Sheets

NET DEVICE

BACKGROUND

1. Field of the Invention

Generally, the invention relates to netting devices and more specifically to such netting devices which structurally provide for protection by an outer hoop member for net material secured relative to a generally rigid inner hoop member.

2. Description of the Prior Art

Numerous types of netting devices exist to trap various objects within a net material subsequent to passage of the object through an opening of the netting device. Netting devices applicable to the present invention will typically have a handle for user manipulation of the respective device. A large class of such devices are employed to retrieve objects from bodies of water. Landing nets permit a fish caught on an assembly having a hook and line to be trapped within the net and removed from the water. This arrangement prevents the fisherman from having to place undue stress and strain on the line, the hook and the attachment between the line and the hook during removal of the fish from the water. The term fisherman, the conventionally recognized designation, as used herein refers to men, women and children who enjoy the pleasant activity of fishing and is not intended in any way to exclude anyone who enjoys the fine sport. Dip nets permit a fisherman to catch fish by manipulating the net where the fish moves through a hoop having net material attached thereabout and becomes trapped in excess net material extending away from the hoop. Landing nets and dip nets may be interchanged in usage although typically dip nets are of a sturdier construction.

It is conventionally known to have the net material directly attached to a hoop of a net where the hoop penetrates various of the passageways between strand material of the net about the opening of the net. This arrangement is commonly performed during assembly of the net at the time of production. Alternatively, it is conventionally known to tie the net onto the hoop of the net where a separate strand material penetrates a passageway between strand material of the net about the opening of the net and then surrounds the hoop and is tied. Often this arrangement will involve a plurality of lengths of the strand material. A variation on this arrangement involves a wrapping of the hoop by a single long length of strand material with the strand material penetrating adjacent or select passageways of the strand material of the net during travel around the hoop.

Netting devices applicable to the present invention often receive rough treatment during use, transport and storage. During use the hoop of the net device will often come into contact with objects or surfaces, including the bottom of the body of water. While this bottom of the body of water contact is true of landing nets, depending upon the location of the fisherman and the depth of the water, it is often true for use of dip nets, including gill nets. The term gill net refers to net devices which have net material of a configuration, including passageway sizing between cooperating strands of the net material, which permit entry of the head of the targeted fish but do not permit complete passage of the target fish through the net material of the net device. Following this passage of the head of the target fish into the net material the gills of the target fish become entangled by the net material of the net device. The net material of gill nets can be configured to trap certain types of fish of a certain size range.

During the catching of fish with dip nets, and particularly gill nets, the fisherman will often move the net device across the bottom of the body of water while advancing the net device toward the fish to be caught. A common use of dip nets involves the fisherman walking along the bank of the stream or river in the direction of the natural flow of the water, but faster, so that the bag of the net extends outward behind the hoop of the dip net. In this instance the fish to be caught would be moving upstream and would enter the bag of the net. In the case of gill nets the target fish would become entangled at their gills within the dip net. The fisherman often will then reposition the hoop of the net toward the bottom of the body of water and drag the hoop out of the water and up the bank of the river or stream. This action, for conventional net devices, produces a great deal of wear and stress on the net material in contact with the hoop of the conventional net device. In many conventional netting operations utilizing conventional net devices the netting material about the hoop, or the strand material used to secure the net to the hoop, may make contact with structures of the bed of the stream or river or with structures on the land. Prolonged use in this manner will often wear and damage the net or the strand material surrounding the hoop of the dip net of conventionally known net devices.

Often net devices will be laid upon the ground or dock or placed on the floor of a boat or of an automobile. On these occasions the hoop of the net may make contact with the surface, either along a portion of the hoop or, if placed on a flat surface, along the entire perimeter of the hoop. This results in the material surrounding the hoop being in pressure bearing contact between the surface upon which the hoop rests and the hoop itself. This contact often causes wear to this material reducing the life cycle of the material. It is common practice to place other objects on net devices during use, transport or storage causing additional pressure to be applied to the net material, or material tying the net material to the hoop, about the hoop. This increases the potential for wear to such material at contact points with the hoop. This is particularly true during transport in a vehicle where movement and vibration of the vehicle is transferred to the net device causing additional wear.

As can readily be seen the net material, or the strand material if the net is tied to the hoop, surrounding the hoop of conventional net devices can sustain considerable wear and tear which reduce the period of time where optimal performance will be obtained.

Various deficiencies exist with the conventional net devices which allow excessive wear to occur to the attached net material at contact points between the conventional net devices and the net material. As such, it may be appreciated that there continues to be a need for a net device which protects the contact points between the net device and the net material during routine usage while not applying any structurally induced pressure to these contact points. The present invention substantially fulfills these needs.

SUMMARY

In view of the foregoing disadvantages inherent in the known types of dip net devices, your applicant has devised a dip net device to retain a net material, forming a bag of the net, to contain an object within the bag of the net during removal of the object from a body of liquid. The dip net device protects the net material at contact points between the dip net device and the net material. The dip net device has a body and net retention means. The body has a handle and a major hoop member. The handle provides for user manipulation of the dip net device. The major hoop member has a first side, a second side, a passageway and an inner protection area. The passageway is through the major hoop member and extends between the first side and the second side. The inner protection area is situated within the passageway of the major hoop member and between the first side and the second side. The inner protection area has an outer closed perimeter in close proximity to the major hoop member. The net retention means retains the net material relative to the major hoop member of the body where the bag of the net extends away from the passageway of the major hoop member of the body. The net retention means has a plurality of contact points between the dip net device and the net material. Each of the contact points resides completely within the inner protection area of the major hoop member of the body and generally at the outer closed perimeter of the inner protection area of the major hoop member of the body. This provides for the contact points to be protected from many forms of contact damage which occur during routine use of the dip net device while performing netting operations.

My invention resides not in any one of these features per se, but rather in the particular combinations of them herein disclosed and it is distinguished from the prior art in these particular combinations of these structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore a primary object of the present invention to provide structural protection to contact points between a net device and net material attached to the net device to significantly reduce wear to the net material at these contact points.

Other objects include:
a) to provide for a major hoop member of the net device to radially surround and protect a minor hoop member having the net material attached thereto.
b) to provide for the major hoop member to have a significantly larger diameter than a diameter of the minor hoop member.
c) to provide for the minor hoop member to be retained in close proximity to the major hoop member to maximize the passageway through the net device.
d) to provide for a plurality of coupling members engaging the minor hoop member to be radially distributed in secured spaced orientation on the major hoop member.
e) to provide for the coupling members to have passageways therethrough which the minor hoop member passes through to securely contain the minor hoop member relative to the major hoop member.
f) to provide for the minor hoop member to be removeably secured relative to the coupling members where easy removal of the minor hoop member may selectively occur to permit replacement of the net material when desired.
g) to provide for the removal and installation of the minor hoop member to occur utilizing an axial rotation of the freed minor hoop member relative to a center of the passageway formed by the minor hoop member.
h) to provide for individual securing of opposing ends of the minor hoop member to occur relative to a single anchoring coupling member where inward and outward movement of both ends of the minor hoop member is prevented.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated the preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION

Many different net devices having features of the present invention are possible. The following description describes the preferred embodiment of select features of those net devices and various combinations thereof. These features may be deployed in various combinations to arrive at various desired working configurations of net devices.

Reference is hereafter made to the drawings where like reference numerals refer to like parts throughout the various views.

Bag of the net as used herein refers to the strand material which extends from, or relative from, the structure of the present invention to form a variable three dimensional form which permits the passage of fluid therethrough and objects of a size up to a predetermined size therethrough.

Net material as used herein refers to the conventional netting material forming the bag of the net and any material utilized to secure the bag of the net to the structure of the present invention whether that securing material is part of the bag of the net or a secondary intermediate material between the bag of the net and the structure of the present invention. Net material is a workpiece with which structures of the present invention operate.

Hoop as used herein refers to a generally rigid material in a configuration to define a passageway as conventionally known but is not limited to being in endless contact around the passageway and is not limited to being a single continuous piece of material and is not limited to any cross section configuration of the material and is not limited to a geometric shape of the hoop including not being limited to residing on a single plane of projection. Gill nets which are to be used along a bank of a river or stream preferably will have the side of the opening which will be closest to the bottom of the river or stream during use of a generally straight configuration, or a configuration which is straighter than the remainder of the opening. This configuration of opening provides for fuller coverage of the bed of the river or stream during the netting operation.

A dip net device, net device, 20 retains a net material 22. Net material 22 forms a bag of the net 24 while positioned on dip net device 20. Bag of the net 24 contains an object 26 during removal of object 26 from a body of liquid 28 utilizing dip net device 20. Dip net device 20 protects net material 22 at contact points 30 between dip net device 20 and net material 22. Dip net device 20 has a body 32 and net retention means.

Body 32 has a handle 34 and a major hoop member, major member, 36. Handle 34 provides for user manipulation of dip net device 20. Body 32 of dip net device 20 preferably is at least substantially constructed from a hollow tubular material 38. In the most preferred embodiment depicted body 32 of dip net device 20 further comprises at least one sealed cavity 40 to provide for dip net device 20 to have a buoyancy while loose in body of liquid 28.

Net retention means, in a broad concept, refers to contact of net material 22 on a minor hoop member 42. This is either provided for by having net material 22 surround minor hoop member 42 at spaced locations thereon or by having net material 22 tied, or otherwise fastened, to minor hoop member 42. Net retention means has minor hoop member, minor member, 42 and securement means to secure minor hoop member 42 relative to major hoop member 36. Securement means preferably is structurally provided for by a plurality of coupling members 44.

Major hoop member 36 attaches relative to a distal end 46 of handle 34. Major hoop member 36 has a first side 48, a second side 50, a passageway 52 and an inner protection area 54. Major hoop member 36 defining an outer closed perimeter 56 of inner protection area 54. Major hoop member 36 has an inner surface 58 facing directly into inner protection area 54 and an outer surface 60 positioned opposite inner surface 58. Passageway 52 extends through major hoop member 36 between first side 48 and second side 50. Inner protection area 54 is situated within passageway 52 of major hoop member 36 between first side 48 and second side 50. Inner protection area 54 has outer closed perimeter 56 preferably defined by inner surface 58 of major hoop member 36. Preferably major hoop member 36 is of a tubular configuration 62 having a generally round cross section. In the most preferred embodiment major hoop member 36 is generally constructed of hollow tubular material 38. In the embodiment depicted in the various views both handle 34 and major hoop member 36 are formed of hollow tubular material 38, just of different diametric measurements.

Handle 34 is connected to major hoop member 36 to extend therefrom away from inner protection area 54. Handle 34 has a user manipulation end 64 and distal end 46. Handle 34 further has an extension portion 66 and a grip portion 68. Extension portion 66 extends away from major hoop member 36 with grip portion 68 laterally intersecting extension portion 66 generally at user manipulation end 64 of handle 34. Grip portion 68 provides for ease of handling when one hand of the user, not shown in any of the views, is thereon and the opposing hand is on extension portion 66.

Net retention means has the plurality of contact points 30 between dip net device 20 and net material 22. Each contact point 30 resides completely within inner protection area 54 of major hoop member 36 of body 32 and generally at outer closed perimeter 56 of inner protection area 54 of major hoop member 36 of body 32.

Net retention means preferably is provided for by minor hoop member 42 which is secured relative to major hoop member 36 while residing within inner protection area 54 of major hoop member 36 generally at outer closed perimeter 56 of inner protection area 54 of major hoop member 36. Contact points 30 of the net retention means are in contact with minor hoop member 42 with a portion of net material 22 adjacent each contact point 30 passing between major hoop member 36 and minor hoop member 42. In the most preferred embodiment contact points 30 do not pressure touch major hoop member 36 even within inner protection area 54.

Minor hoop member 42 at least partially defining a passageway 70. Passageway 70 defines the opening of bag of the net 24 when net material 22 is installed on net device 20. Preferably minor hoop member 42 is of a shaft configuration 72 with a generally round cross section and is constructed of a solid rod material 74. Minor hoop member 42 defining an inner closed perimeter 76. Minor hoop member 42 has an inner surface 78 an outer surface 80 positioned opposite inner surface 78. Inner surface 58 of major hoop member 36 preferably faces directly into outer surface 80 of minor hoop member 42. Net material attaches to minor hoop member 42 at the plurality of contact points 30. A substantial quantity of net material 22 extends away from minor hoop member 42 forming bag of the net 24.

Figure 1A:
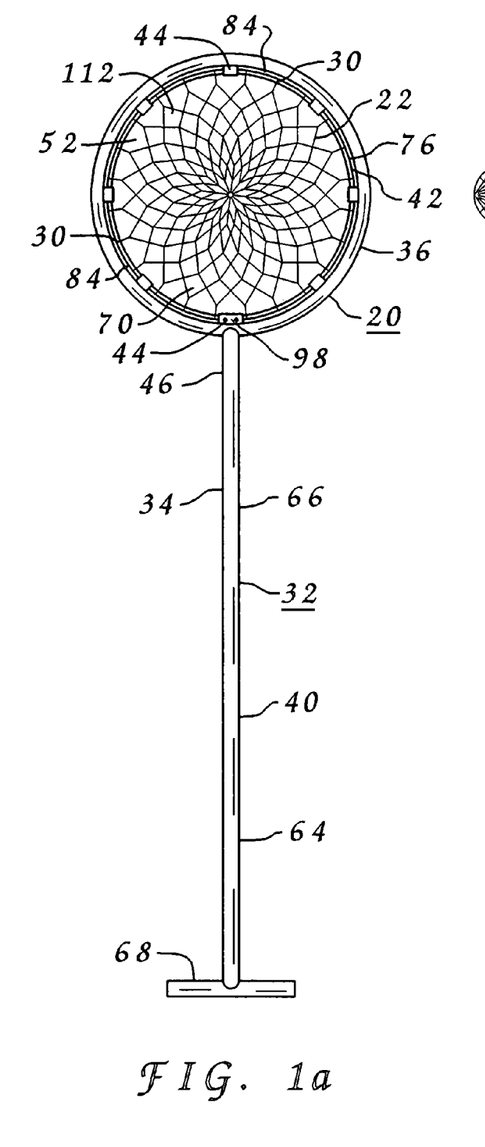
FIG. 1a is a top plan view of a net device with net material attached.
Figure 1B:
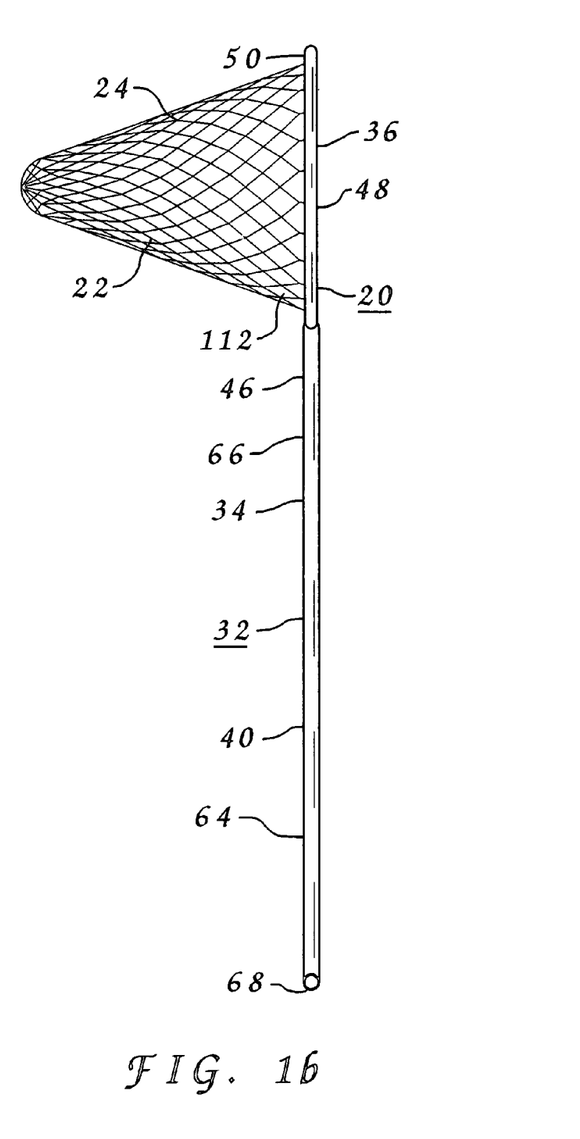
FIG. 1b is a side elevational view of the net device and net material.
Figure 2:
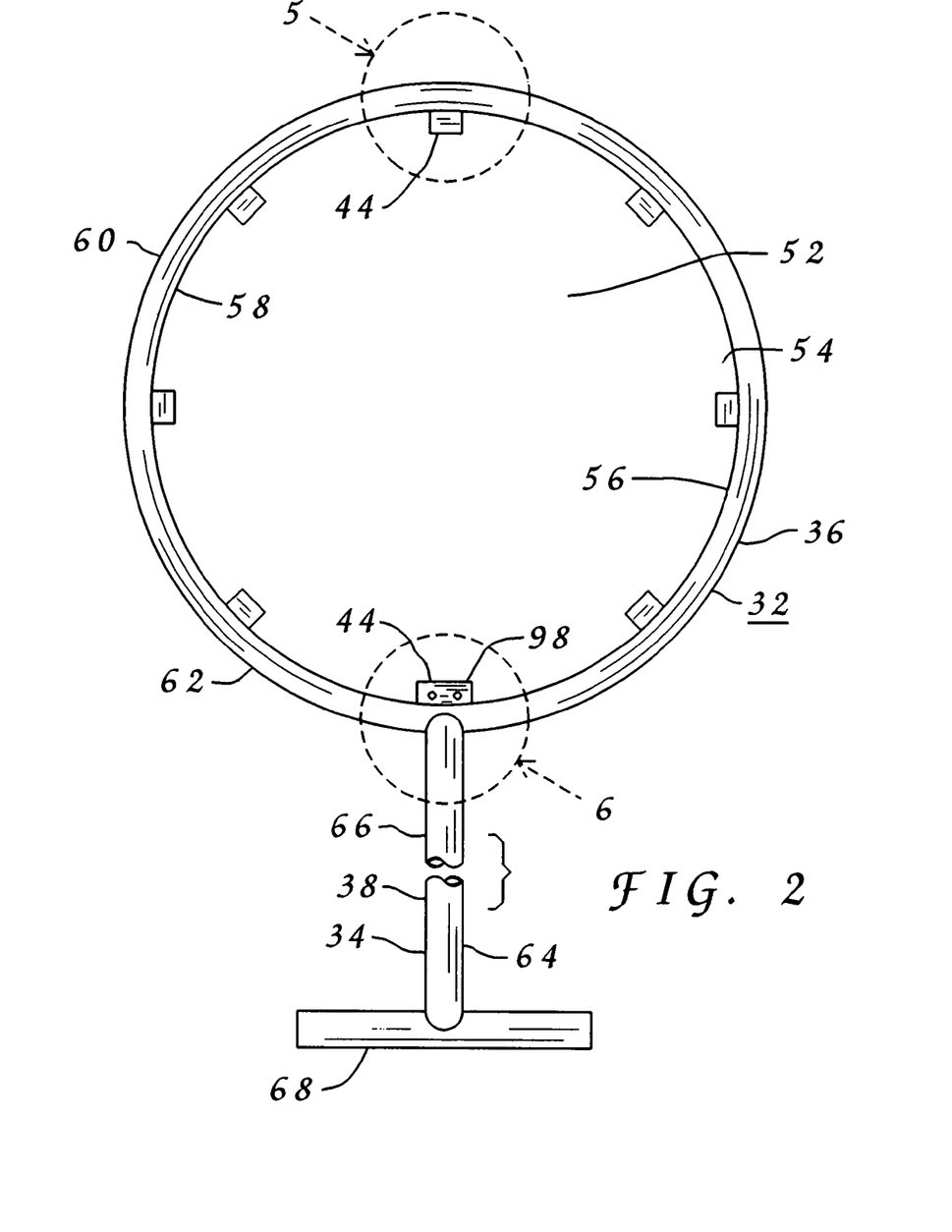
FIG. 2 is a top plan view of the body and handle of the net device.
Figures 3, 4:
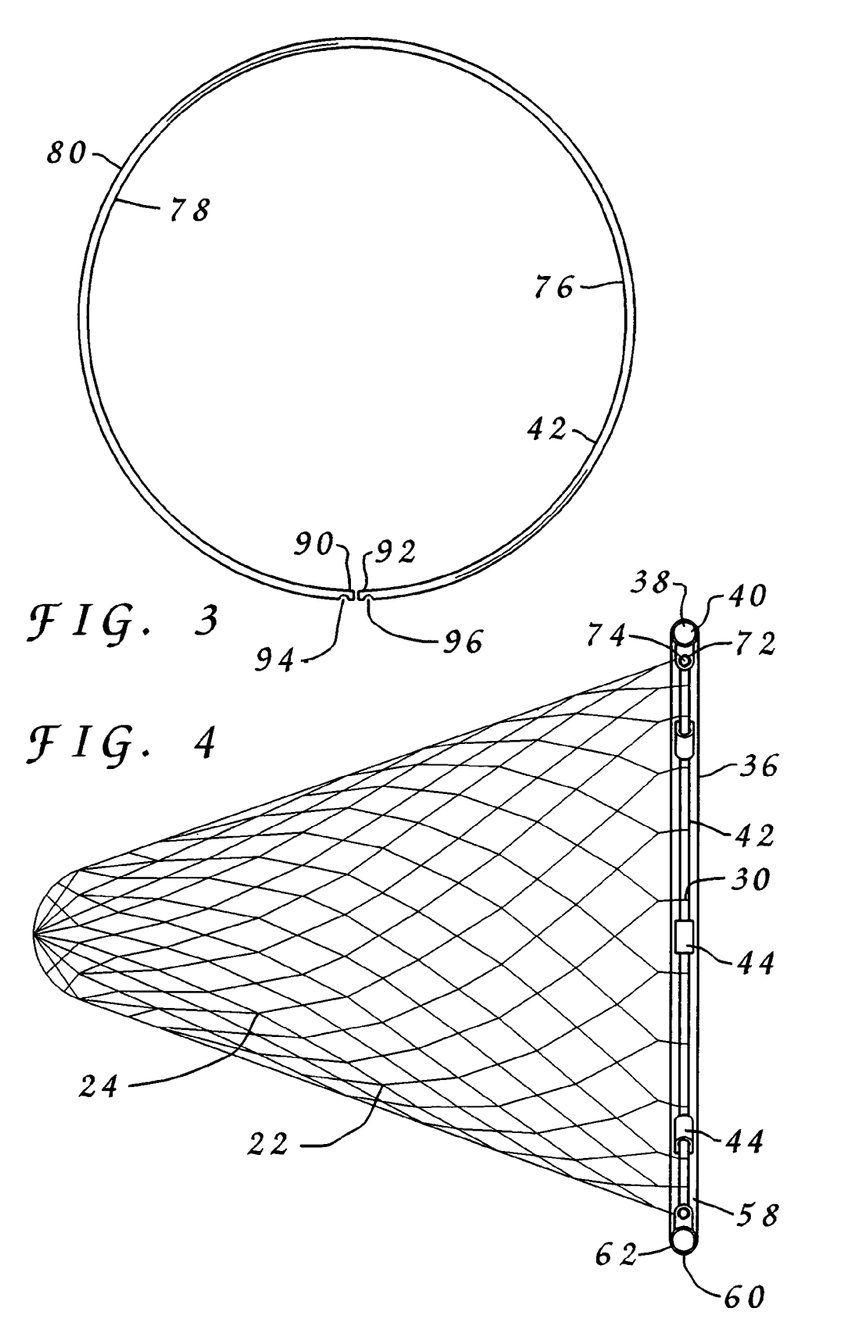
FIG. 3 is a top plan view of a minor hoop member of the net device.
FIG. 4 is a partial sectional view of the net device with half of the major and minor hoop members removed.
Figure 5:
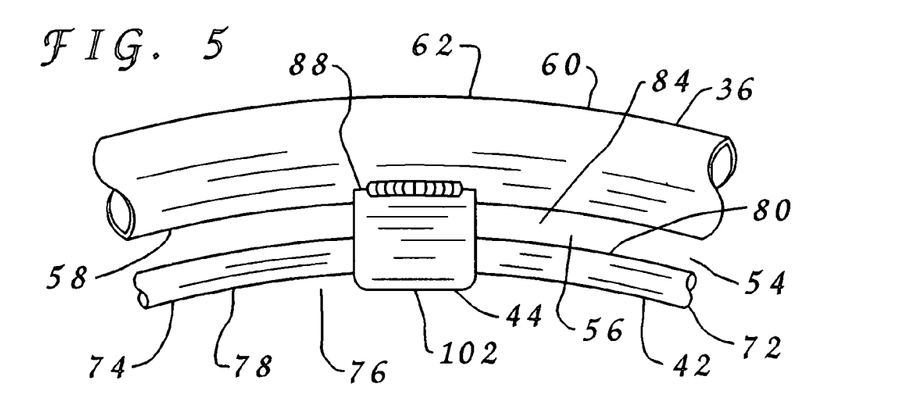
FIG. 5 is a partial top plan view as taken from the section reference '5' shown in FIG. 2 with a corresponding portion of the minor hoop member depicted.
Figure 6:
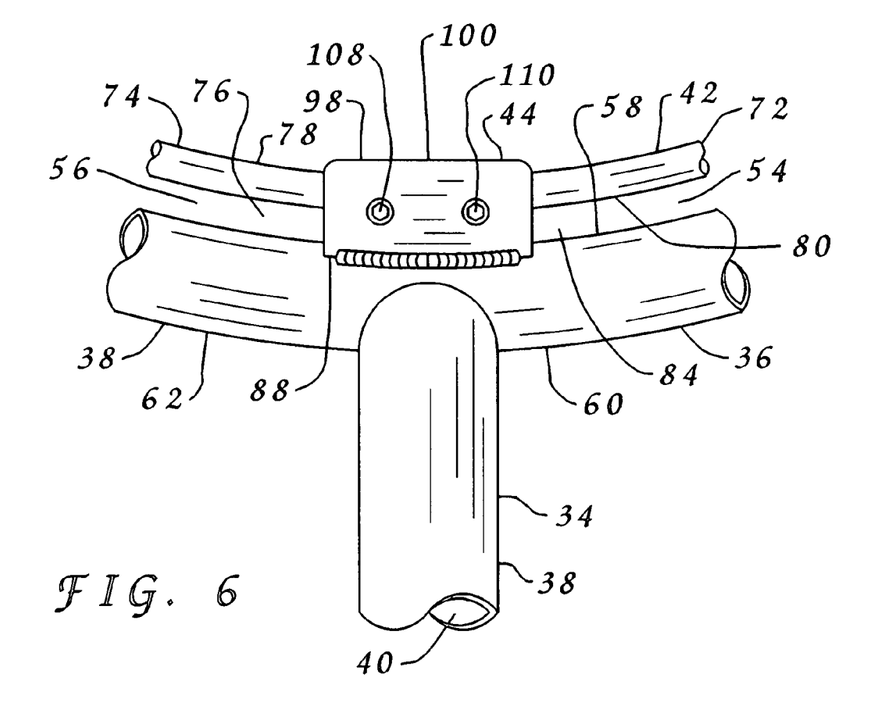
FIG. 6 is a partial top plan view as taken from the section reference '6' shown in FIG. 2 with a corresponding portion of the minor hoop member depicted.
Figure 7:
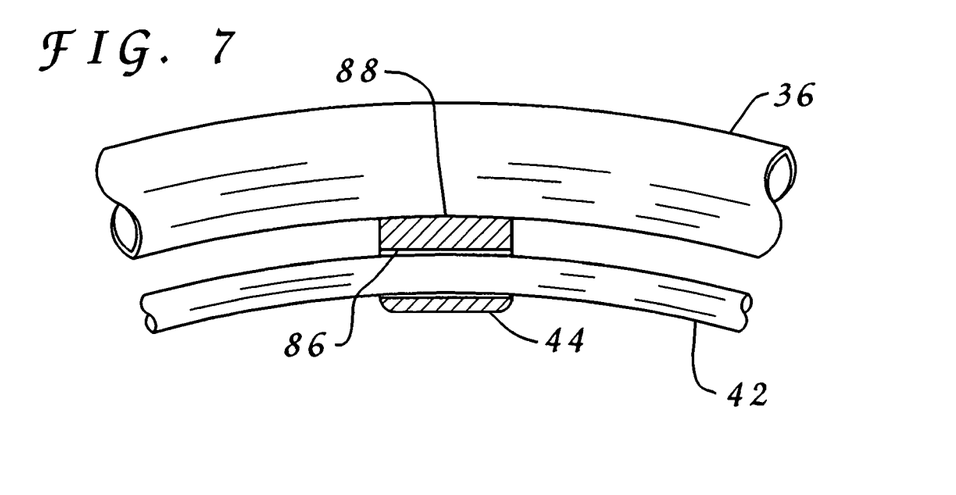
FIG. 7 is a partial top plan view as shown in FIG. 5 with the coupling member shown in sectional cutaway.
Figure 8:
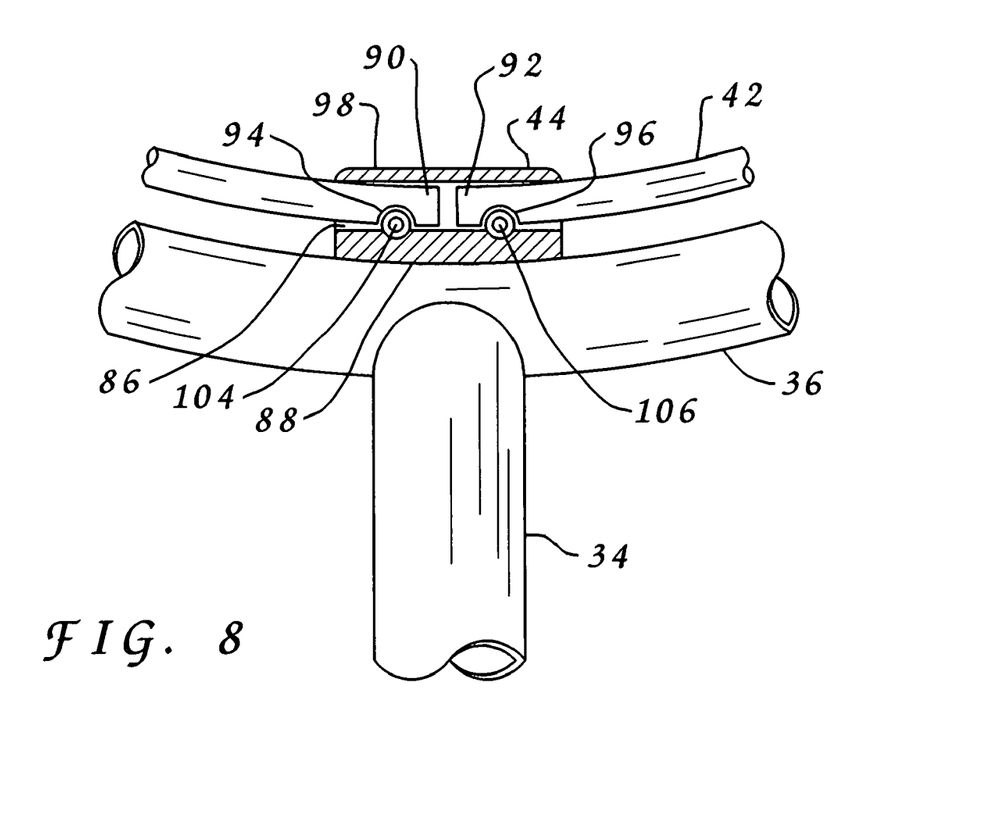
FIG. 8 is a partial top plan view as shown in FIG. 6 with the anchoring coupling member shown in sectional cutaway.
Figure 9:
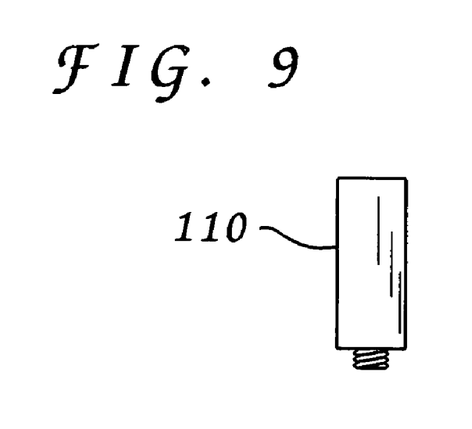
FIG. 9 is a side elevational view of a securing member.
Figure 10:
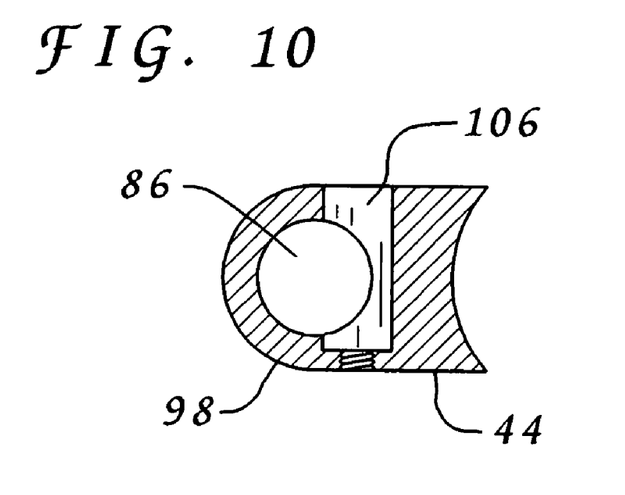
FIG. 10 is a sectional view of the anchoring coupling member.
Figure 11:
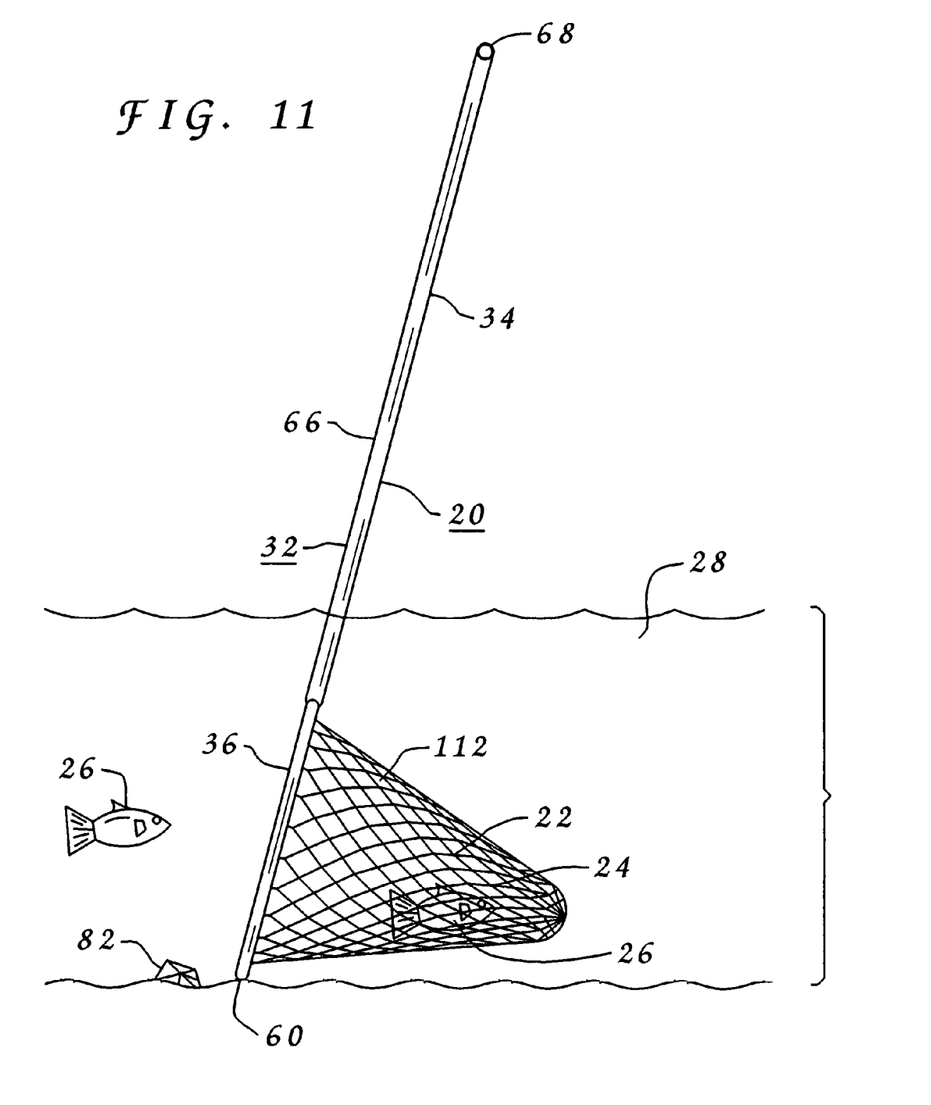
FIG. 11 is a side elevational view of the net device, with attached net material, shown in a body of liquid during usage.
Figure 12A:
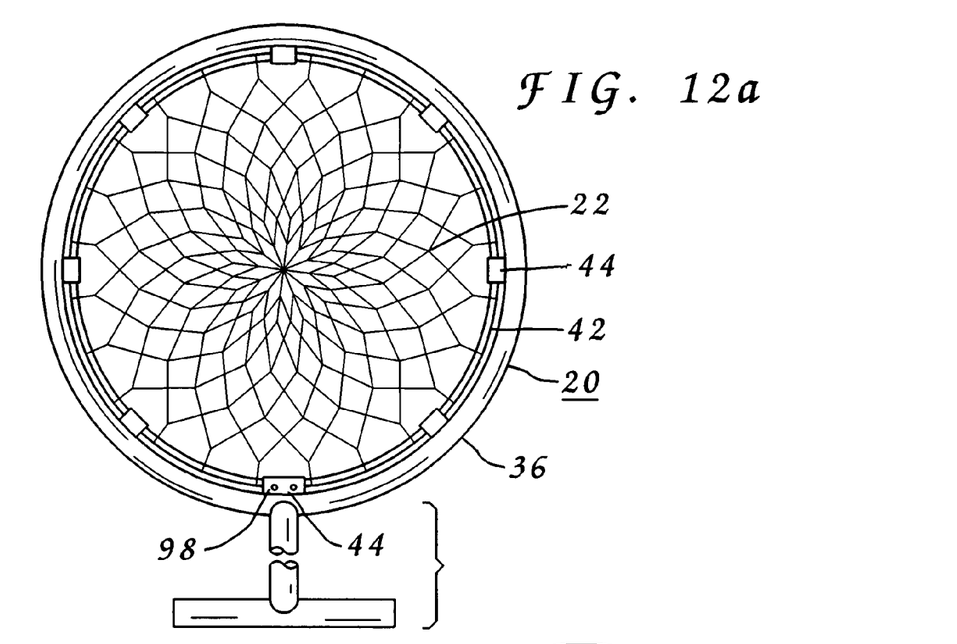
FIG. 12a through FIG. 12d are top plan views of the net device depicting various orientations during removal of a net material and installation of a net material.
Figure 12B:
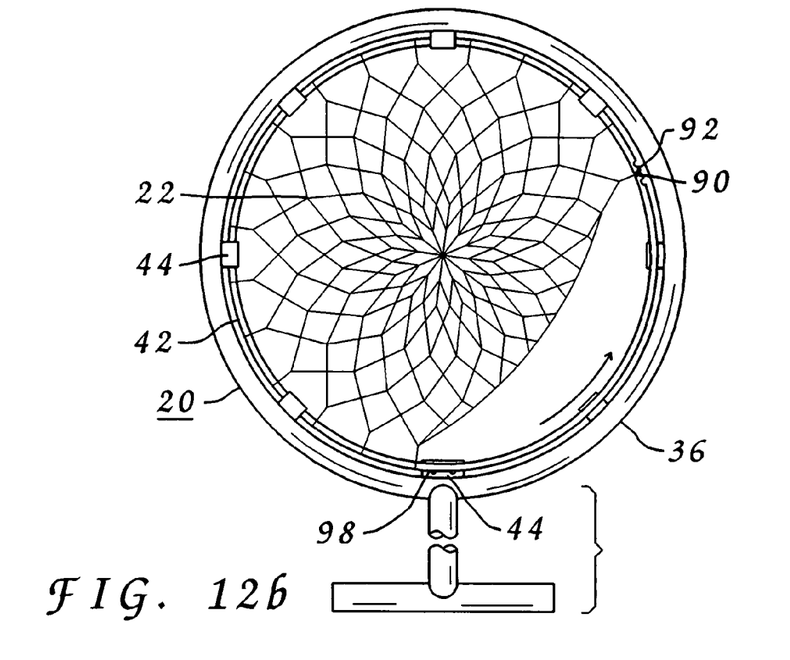
Figure 12C:
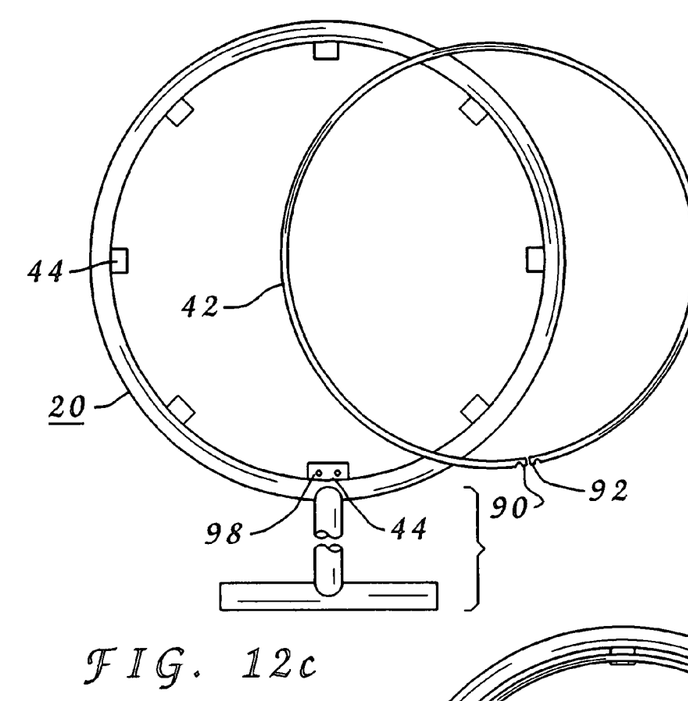
Figure 12D:
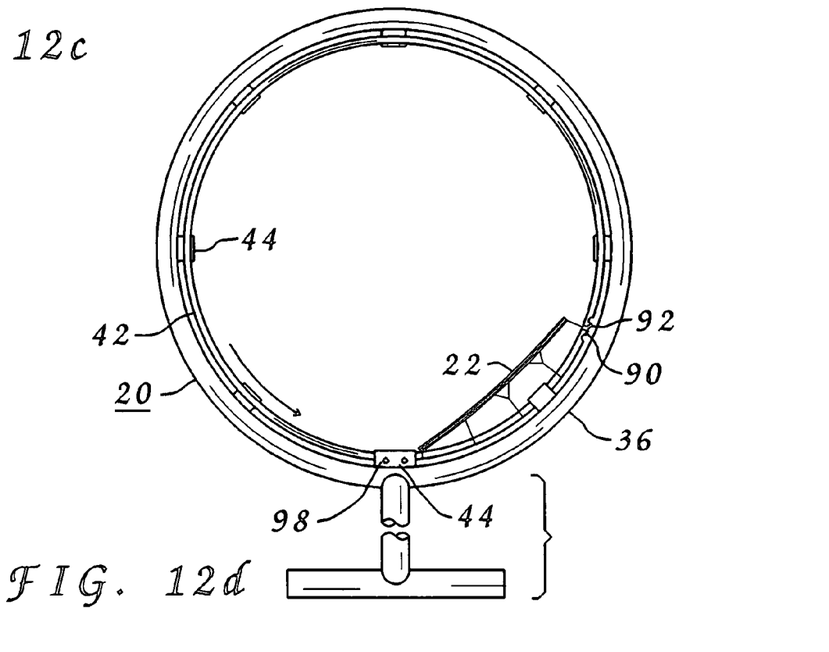

Contact points 30 are protected by major hoop member 36 during many potential contacts by outer surface 60, first side 48 and second side 50 of major hoop member 36. FIG. 11 depicts a potential contact by dip net device 20 with obstruction 82 during routine usage. The protection provided by major hoop member 36 prevents damage to the portion of net material 22 secured to minor hoop member 42 at contact points 30 of dip net device 20 during such contact.

A plurality of closed securement passages 84 exist between major hoop member 36 and minor hoop member 42. Net material 22 at each contact point 30 passes through a respective closed securement passages 84.

The plurality of coupling members 44 are secured in spaced relationship around major hoop member 36 of dip net device 20 and extend into inner protection area 54 of major hoop member 36. Each coupling member 44 radially engages and surrounds a portion of minor hoop member 42 of dip net device 20. Coupling members 44 provide for minor hoop member 42 to be spaced from major hoop member 36 and to resides generally within inner protection area 54 of major hoop member 36.

Each coupling member 44 has a passageway 86 therethrough. Each passageway 86 of each respective coupling member 44 is positioned generally parallel to and spaced from major hoop member 36 at a point of contact 88 between the respective coupling member 44 and major hoop member 36. Minor hoop member 42 passing through passageway 86 of each coupling member 44.

In a preferred embodiment minor hoop member 42 slidably engages coupling members 44 in a loop and is secured relative to a respective coupling member 44. Minor hoop member 42 has a first end 90 and a second end 92 with first end 90 having a first anchoring configuration 94 thereat and second end 92 having a second anchoring configuration 96 thereat. One coupling member 44 is an anchoring coupling member 98 having locking means to secure minor hoop member 42 passing therethrough relative to anchoring coupling member 98. Anchoring coupling member 98 has a length 100 while the remaining coupling members 44 each have a length 102. Length 100 of anchoring coupling member 98 is significantly longer than length 102 of each remaining coupling member 44. Anchoring coupling member 98 has a first aperture 104 therethrough and a second aperture 106 therethrough. A first securing member 108 and a second securing member 110 are provided to penetrate first aperture 104 and second aperture 106 respectively of anchoring coupling member 98. During this penetration first securing member 108 engages first anchoring configuration 94 of minor hoop member 42 within anchoring coupling member 98 while second securing member 110 engages second anchoring configuration 96 of minor hoop member 42 within anchoring coupling member 98. These engagements prevent significant movement of minor hoop member 42 relative to anchoring coupling member 98.

FIG. 12a through FIG. 12d depict removal of net material 22 from minor hoop member 42 and installation of net material 22 on minor hoop member 42. Sliding minor hoop member removal means provides for opening closed securement passages 84 where net material 22 passing through each respective closed securement passage 84 may be removed and replaced. Removal of first securing member 108 and second securing member 110 to free minor hoop member 42 relative to coupling members 44 readily provides for this desire. Subsequent to such removal, minor hoop member 42 is axially displaced through the sequence of coupling members 44 until all closed securement passages 84 are assessable then net material 22 is removed. To install, or reinstall, net material 22 select passages 112 of net material 22 are threaded onto minor hoop member 42 during axial replacement through the series of coupling members 44. Following such placement first securing member 108 and second securing member 110 are installed to again retain minor hoop member 42 relative to major hoop member 36.

With respect to the above description then, it is to be realized that the optimum dimensional relationships for the parts of the invention, to include variations in size, material, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A dip net device to retain a workpiece net material, the workpiece net material forming a bag of the net to contain an object within the bag of the net during removal of the object from a body of liquid, the dip net device to protect the workpiece net material at contact points between the dip net device and the workpiece net material, the dip net device comprising:
  a) a body having:
    i) a handle for user manipulation of the dip net device;
    ii) a major hoop member having:
      1) a first side;
      2) a second side;
      3) a passageway through the major hoop member and extending between the first side and the second side;
      4) an inner protection area situated within the passageway of the major hoop member and between the first side and the second side, the inner protection area having an outer closed perimeter in close proximity to the major hoop member;
  b) a plurality of coupling members secured in spaced relationship to the major hoop member of the dip net device to extend into the inner protection area of the major hoop member, each of the coupling members radially engaging and surrounding a portion of the minor hoop member of the dip net device;
  c) minor hoop member secured relative to the major hoop member and residing within the inner protection area of the major hoop member generally at the outer closed perimeter of the inner protection area of the major hoop member and wherein the contact points of the net retention means are in contact with the minor hoop member and wherein the minor hoop member further comprises a first end and a second end and wherein the first end of the minor hoop member has a first anchoring configuration thereat and wherein the second end of the minor hoop member has a second anchoring configuration thereat and wherein one of the coupling members further comprises an anchoring coupling member having a first aperture therethrough and a second aperture therethrough and wherein the dip net device further comprises a first securing shaft and a second securing shaft and wherein the first securing shaft penetrates the first aperture of the anchoring coupling member and engages the first anchoring configuration of the minor hoop member and wherein the second securing shaft penetrates the second aperture of the anchoring coupling member and engages the second anchoring configuration of the minor hoop member;
  d) net retention means to retain the workpiece net material relative to the major hoop member of the body where the bag of the net extends away from the passageway of the major hoop member of the body, the net retention means having a plurality of contact points between the dip net device and the workpiece net material, and wherein each of the contact points reside completely within the inner protection area of the major hoop member of the body and generally at the outer closed perimeter of the inner protection area of the major hoop member of the body.

2. The dip net device defined in claim 1 wherein each of the contact points do not pressure touch the major hoop member.

3. The dip net device defined in claim 1 wherein the body of the dip net device is at least substantially constructed from a hollow tubular material and wherein the body of the dip net device further comprises at least one sealed cavity to provide for the dip net device to have a buoyancy.

4. A dip net device to retain a workpiece net material, the workpiece net material forming a bag of the net to contain an object within the bag of the net during removal of the object from a body of liquid, the dip net device to protect the workpiece net material at contact points between the dip net device and the workpiece net material, the dip net device comprising:
a) a handle having:
   i) a user manipulation end;
   ii) a distal end;
b) a major member attached relative to the distal end of the handle, the major member defining an outer closed perimeter, the major member having:
   i) an outer surface;
   ii) an inner surface;
c) a minor member defining an inner closed perimeter, the minor member having:
   i) an outer surface;
   ii) an inner surface defining an opening of the dip net device, the workpiece net material attachable relative to the minor member at a plurality of the contact points and wherein the workpiece net material has a substantial quantity of material extending away from the minor member forming the bag of the net, and wherein objects entering the opening of the minor member of the dip net device must encounter the workpiece net material and pass therethrough or be retained thereby and wherein the portion of the workpiece net material secured to the minor member at the contact points is protected by the major member during contact by the outer surface of the major member of the dip net device with obstructions during routine usage to prevent damage to the portion of the workpiece net material secured to the minor member at the contact points of the dip net device during such contact;

and wherein the minor member is secured relative to the major member with a plurality of closed securement passages therebetween and wherein workpiece net material in close proximity to each of the contact points passes through a respective closed securement passage between the minor member and the major member;
d) sliding minor member removal means to provide for opening the closed securement passages wherein the workpiece net material passing through each respective closed securement passage may be removed and replaced.

5. The dip net device defined in claim 4 wherein the major member is generally constructed of a hollow tubular material.

6. The dip net device defined in claim 4 wherein the minor member is generally constructed of a solid rod material.

7. The dip net device defined in claim 4 wherein the handle further comprises an extension portion and a grip portion, the extension portion extending away from the major member and the grip portion laterally intersecting the extension portion generally at the user manipulation end of the handle.

8. A dip net device to retain a workpiece net material, the workpiece net material forming a bag of the net to contain an object within the bag of the net during removal of the object from a body of liquid, the dip net device to protect the workpiece net material at contact points between the dip net device and the workpiece net material, the dip net device comprising:
a) a body having:
   i) a handle for user manipulation of the dip net device;
   ii) a major hoop member having:
      1) a first side;
      2) a second side;
      3) a passageway through the major hoop member and extending between the first side and the second side;
      4) an inner protection area situated within the passageway of the major hoop member and between the first side and the second side, the inner protection area having an outer closed perimeter in close proximity to the major hoop member;
b) a plurality of coupling members secured in spaced relationship to the major hoop member of the dip net device to extend into the inner protection area of the major hoop member, each of the coupling members radially engaging and surrounding a portion of the minor hoop member of the dip net device and wherein one of the coupling members further comprises an anchoring coupling member having locking means to secure the minor hoop member passing therethrough relative to the anchoring coupling member and wherein the anchoring coupling member has a length and wherein the remaining coupling members each have a length and wherein the length of the anchoring coupling member is significantly longer than the length of each of the remaining coupling members;
c) minor hoop member secured relative to the major hoop member and residing within the inner protection area of the major hoop member generally at the outer closed perimeter of the inner protection area of the major hoop member and wherein the contact points of the net retention means are in contact with the minor hoop member;
d) net retention means to retain the workpiece net material relative to the major hoop member of the body where the bag of the net extends away from the passageway of the major hoop member of the body, the net retention means having a plurality of contact points between the dip net device and the workpiece net material, and wherein each of the contact points reside completely within the inner protection area of the major hoop member of the body and generally at the outer closed perimeter of the inner protection area of the major hoop member of the body.

9. The dip net device defined in claim 8 wherein each of the contact points do not pressure touch the major hoop member.

10. The dip net device defined in claim 8 wherein the body of the dip net device is at least substantially constructed from a hollow tubular material and wherein the body of the dip net device further comprises at least one sealed cavity to provide for the dip net device to have a buoyancy.

* * * * *